United States Patent
Chen et al.

(10) Patent No.: US 12,474,229 B2
(45) Date of Patent: Nov. 18, 2025

(54) LEAK AUTO DETECTION FOR A RACK LIQUID COOLING SYSTEM

(71) Applicant: Quanta Computer Inc., Taoyuan (TW)

(72) Inventors: Li-Tsung Chen, Taoyuan (TW); Yen-Ping Tung, Taoyuan (TW)

(73) Assignee: QUANTA COMPUTER INC., Taoyuan (TW)

( * ) Notice: Subject to any disclaimer, the term of this patent is extended or adjusted under 35 U.S.C. 154(b) by 307 days.

(21) Appl. No.: 18/338,145

(22) Filed: Jun. 20, 2023

(65) Prior Publication Data

US 2024/0344919 A1    Oct. 17, 2024

Related U.S. Application Data

(60) Provisional application No. 63/495,446, filed on Apr. 11, 2023.

(51) Int. Cl.
*G01M 3/28* (2006.01)

(52) U.S. Cl.
CPC .................. *G01M 3/2815* (2013.01)

(58) Field of Classification Search
CPC ............ G01M 3/00; G01M 3/02; G01M 3/26; G01M 3/28; G01M 3/2815; G01M 3/32
See application file for complete search history.

(56) References Cited

U.S. PATENT DOCUMENTS

| 11,868,189 B2 | 1/2024 | Chen et al. |
| 2002/0120411 A1 | 8/2002 | Fierro et al. |

FOREIGN PATENT DOCUMENTS

| EP | 3502644 A1 * | 6/2019 | .......... G01M 3/3272 |
| TW | M619640 U | 11/2021 | |
| TW | 202311899 A | 3/2023 | |
| WO | 2016159410 A1 | 10/2016 | |

OTHER PUBLICATIONS

TW Office Action for Application No. 112133630 mailed Feb. 21, 2024, w/ First Office Action Summary., 11 pp.
TW Search Report for Application No. 112133630 mailed Feb. 21, 2024, w/ First Office Action., 1 p.

* cited by examiner

*Primary Examiner* — Nguyen Q. Ha
(74) *Attorney, Agent, or Firm* — NIXON PEABODY LLP

(57) ABSTRACT

A method for testing a closed cooling loop for leaks. The method includes causing air to be pumped into the cooling loop. The method further includes identifying an initial internal temperature reading and an initial internal pressure reading of the cooling loop. In response to a predetermined amount of time passing since the air was pumped into the cooling loop, the method includes identifying an updated internal temperature reading and an updated internal pressure reading of the cooling loop. Thereafter, (i) the initial internal temperature, (ii) the initial internal pressure readings, (iii) the updated internal temperature, and (iv) the updated internal pressure readings, are used to determine if the cooling loop has a leak. Furthermore, in response to determining that the cooling loop has a leak, a warning is issued.

17 Claims, 3 Drawing Sheets

LEAK AUTO DETECTION FOR A RACK LIQUID COOLING SYSTEM

CROSS-REFERENCE TO RELATED APPLICATIONS

This application claims priority from and benefit of U.S. Provisional Patent Application Ser. No. 63/495,446, filed on Apr. 11, 2023, titled "LEAK AUTO DETECTION FOR A RACK LIQUID COOLING SYSTEM," which is hereby incorporated by reference herein in its entirety.

TECHNICAL FIELD

The present invention relates to physical cooling systems, and more particularly, to the process of testing and preparing cooling loops for implementation in compute systems.

BACKGROUND

Computational devices are often complex systems that are run by operating systems. These operating systems are run on hardware that that supports a wide variety of compute functions. While this allows computational devices to have broad functionality, they produce a significant amount of thermal heat while doing so. This heat is generated as an unintentional biproduct as electricity flows through the various circuits and resistors inside a computational device. Physical systems like computational devices are unable to operate in a lossless manner, causing some of the energy used during operation to be converted into thermal heat and lost as a result.

Various attempts have been made to reduce or counteract this thermal heat produced as an unavoidable biproduct for computational devices. For example, electric fans have been implemented to reduce thermal temperatures of systems by forcing cooler air to pass through and adjacent to the physical components that produce the thermal heat. Other attempts involve liquid cooling which uses a coolant in liquid form to transfer heat out of the system.

While liquid cooling is typically more efficient at transferring thermal heat, systems that implement liquid cooling are more susceptible to experiencing failures. For instance, leakages are a common problem in liquid cooling systems. As a result, conventional products have suffered significant amounts of downtime and undesirable operating conditions resulting from failures experienced in the cooling system. Moreover, these inefficiencies have been unresolved. Thus, there is a need for methods, computer program products, and systems that are able to improve the process of managing the thermal settings of compute systems during operation. Moreover, these improvements must be achieved without negatively affecting performance of the systems.

SUMMARY

The term embodiment and like terms, e.g., implementation, configuration, aspect, example, approach, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

It should also be noted that while some of the embodiments herein reference specific types of memory, like flash memory, this is in no way intended to be limiting. Embodiments herein may be implemented in systems having any desired type of random access, non-volatile memory that would benefit from the various achievements herein, e.g., as would be appreciated by one skilled after reading the present description.

A method is disclosed for testing a closed cooling loop for leaks. The method includes causing air to be pumped into the cooling loop. The method further includes identifying an initial internal temperature reading and an initial internal pressure reading of the cooling loop. In response to a predetermined amount of time passing since the air was pumped into the cooling loop, the method further includes identifying an updated internal temperature reading and an updated internal pressure reading of the cooling loop. Thereafter, (i) the initial internal temperature, (ii) the initial internal pressure readings, (iii) the updated internal temperature, and (iv) the updated internal pressure readings, are used to determine if the cooling loop has a leak. Furthermore, in response to determining that the cooling loop has a leak, a warning is issued.

In some implementations, using the internal temperature and pressure readings to determine whether the cooling loop has a leak includes determining whether the initial internal temperature is about equal to the updated internal temperature. In response to determining that the initial internal temperature is about equal to the updated internal temperature, another determination as to whether the initial internal pressure is about equal to the updated internal pressure is made. Moreover, in response to determining that the initial internal pressure is not about equal to the updated internal pressure, the cooling loop is identified as having a leak. However, in response to determining that the initial internal pressure is about equal to the updated internal pressure, the cooling loop is identified as not having a leak. Further still, in response to determining that the initial internal temperature is not about equal to the updated internal temperature, another determination as to whether the initial internal pressure and the updated internal pressure are within a predetermined tolerance is made. In response to determining that the initial internal pressure and the updated internal pressure are within the predetermined tolerance, the cooling loop is identified as not having a leak.

In some implementations, sending the warning indicating the cooling loop has a leak includes sending, from a secure control module, an alert to a remote management console. Moreover, the alert may include information associated with the cooling loop. For instance, the alert may include an estimation of a severity of the leak in the cooling loop.

In other implementations, additional operations are performed in response to determining the cooling loop does not have a leak. For instance, a seal on the cooling loop may be released. Thereafter, the cooling loop may be filled with a liquid (e.g., a liquid coolant).

An example computer program product is for testing a closed cooling loop for leaks. The computer program product includes a computer readable storage medium having program instructions embodied therewith. Moreover, the program instructions are readable and/or executable by a processor to cause the processor to perform the foregoing method.

An example compute system includes a coolant distribution unit and a central controller. The system further includes logic integrated with and/or executable by the central controller, the logic being configured to: perform the foregoing method.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION

Figure 1:
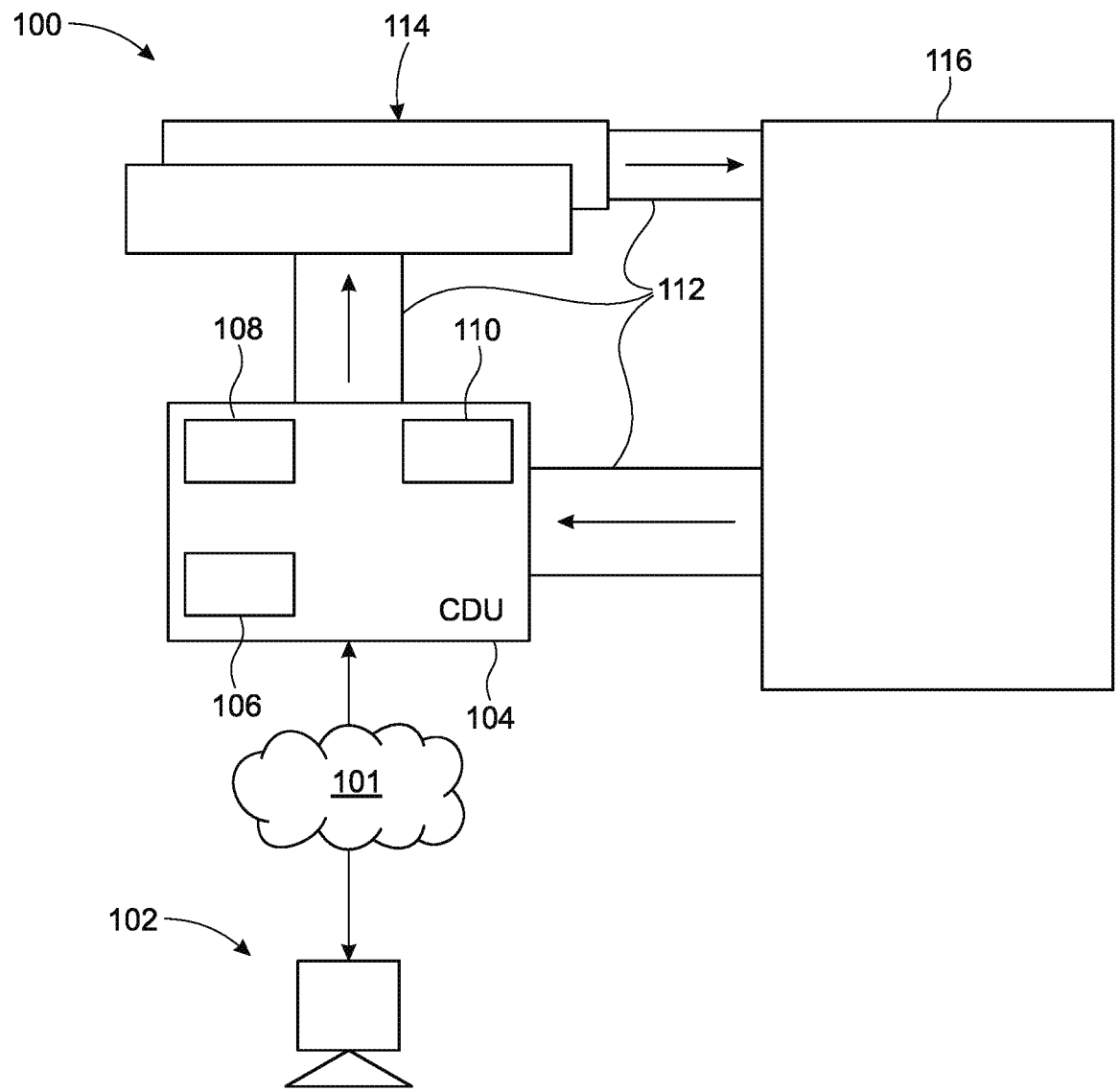
FIG. 1 is a representational view of a system, according to certain aspects of the present disclosure.

The present disclosure is directed toward a computer-implemented method for testing a closed cooling loop for leaks. The computer-implemented method includes causing air to be pumped into the cooling loop, identifying an initial internal temperature reading of the cooling loop, and identifying an initial internal pressure reading of the cooling loop. In response to a predetermined amount of time passing since the air was pumped into the cooling loop, an updated internal temperature reading of the cooling loop is identified, and an updated internal pressure reading of the cooling loop is also identified. Thereafter, (i) the initial internal temperature, (ii) the initial internal pressure readings, (iii) the updated internal temperature, and (iv) the updated internal pressure readings, are used to determine if the cooling loop has a leak. Furthermore, in response to determining the cooling loop has a leak, a warning is issued.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical", "horizontal", "parallel", and "perpendicular" are intended to additionally include "within 3-5% of" a vertical, horizontal, parallel, or perpendicular orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

In sharp contrast to the foregoing conventional shortcomings, implementations included herein are able to ensure cooling systems are able to operate successfully and efficiently during operation of a system that produces thermal heat. Moreover, these improvements are achieved without negatively affecting performance of the system, e.g., as will be described in further detail below.

Looking now to FIG. 1, a compute system 100 is depicted in accordance with one implementation. As an option, the present compute system 100 may be implemented in conjunction with features from any other implementation listed herein, such as those described with reference to the other FIGS. However, such compute system 100 and others presented herein may be used in various applications and/or in permutations which may or may not be specifically described in the illustrative implementations listed herein. Further, the compute system 100 presented herein may be used in any desired environment. Thus FIG. 1 (and the other FIGS.) may be deemed to include any possible permutation.

For instance, the compute system 100 includes a plurality of components therein that are configured in a particular arrangement. However, it should be noted that the configuration illustrated in FIG. 1 is in no way intended to be limiting. For instance, the components may be oriented differently with respect to each other, connected to each other differently, etc. Some implementations may even include fewer components or additional components compared to what is shown.

As shown, a remote controller 102 is connected to (e.g., in communication with) a Coolant Distribution Unit (CDU) 104 over a network 101. The CDU 104 also includes a Secure Control Module (SCM) 106 that may serve as a controller (e.g., processor) for the CDU 104. For instance, the SCM 106 may be configured (e.g., programmed) to support remote management, dynamic coolant adjustment, cooling fan wall control, monitoring leakage and system sensors, etc. According to an example, which is in no way intended to limit the invention, a user can use remote management protocol (e.g., such as Redfish or IPMI) to connect to the SCM 106 to retrieve sensors status and error logs. In situations where a coolant leakage is detected, the SCM 106 may issue logs and send alerts to a remote console. For instance, logs and/or alerts may be sent from the SCM 106 of the CDU 104 to the remote controller 102 which may actually function as a remote management console, e.g., as would be appreciated by one skilled in the art after reading the present description.

The network 101 may be of any desired type, e.g., depending on the desired approach. For instance, in some approaches the network 101 is a WAN, e.g., such as the Internet. However, an illustrative list of other network types which network 101 may implement includes, but is not limited to, a LAN, a PSTN, a SAN, an internal telephone network, etc. Accordingly, the CDU 104 and remote controller 102 are able to communicate with each other regardless of the amount of separation which exists therebetween, e.g., despite being positioned at different geographical locations.

The CDU 104 includes an air pump 108 and a coolant pump 110. In some implementations, the air and coolant pumps 108, 110 are separate components that are implemented in the system 100 differently according to their different configurations. In other implementations, the air and coolant pumps 108, 110 may share one or more components. For example, the motor that creates the pressure used by the air pump 108 to pump the air may be the same motor used by the coolant pump 110.

While the air pump 108 and coolant pump 110 are implemented differently, they are both preferably monitored and controlled by the SCM 106, at least in part. Accordingly, the SCM 106 may be able to control the amount of air and/or coolant being pumped into or out of the coolant loop 112. For example, the SCM 106 may send one or more instructions that cause the air pump 108 and/or coolant pump 110 to generate a pressure that results in a desired amount of air or coolant to be pumped into or out of the coolant loop 112. The SCM 106 is also in communication with the remote controller 102. Thus, the SCM 106 may implement instructions, requests, commands, data, etc., that are received at the CDU 104 from the remote controller 102. The SCM 106 may also perform one or more operations of method 200, e.g., as is described in further detail below.

Referring still to FIG. 1, the CDU 104 is connected to a number of compute nodes 114 by the coolant loop 112. The number and/or type of compute nodes 114 included in the system 100 may vary depending on the implementation. For example, compute nodes that are able to maintain a relatively high throughput may be used in implementations that involve high data traffic. In another example, compute nodes that are able to integrate with a specific computer language and/or perform certain types of data operations may be implemented.

The coolant loop 112 is preferably configured to deliver liquid coolant to the compute nodes 114 such that the coolant is able to absorb at least some of the thermal heat produced by the compute nodes 114, and deliver that thermal heat to the cooling module 116. In other words, the coolant loop 112 is able to remove the thermal heat produced by the compute nodes 114 such that the compute nodes 114 can operate at a desired level of performance without negatively impacting stability of the system 100. This may be accomplished by directing branches of the coolant loop to come into contact with, or at least nearby, portions of the compute nodes 114 that produce thermal heat. Thus, while portions of the coolant loop 112 that extend between the different components of the system 100 may be designed to transfer the liquid coolant, components of the coolant loop 112 (e.g., sidewalls, seals, connection points, pump attachments, etc.) may be configured to circulate a gas coolant, vapor coolants, etc. It should also be noted that the arrowed lines along the coolant loop 112 are included to show the intended direction in which the coolant travels therealong. As a result, cold coolant exits the cooling module 116, travels to the CDU 104 before being delivered to the compute nodes 114 where thermal heat is absorbed before traveling back to the cooling module 116 to be cooled again.

In order to accomplish this transfer of thermal energy, the coolant loop 112 is configured such that liquid coolant delivered to the compute nodes 114 is at a temperature that is at least lower than portions of the compute nodes 114 having a highest temperature. In other words, the coolant that is delivered to the compute nodes 114 is preferably low enough to absorb at least a portion of the thermal energy that is produced by the compute nodes 114 (and any other components in the system). However, as the temperature of the coolant delivered to the compute nodes 114 decreases, the coolant is able to absorb a greater amount of thermal energy from the compute nodes 114. Accordingly, the coolant is preferably as cold as possible without damaging any portions of the system, e.g., such as the coolant loop 112. As previously mentioned, the coolant loop 112 is preferably a closed system in that coolant and even air is unable to enter or exit the coolant loop 112. This improves efficiency of the system by improving the thermal capacity of the coolant loop 112.

As shown, the coolant loop 112 directs the coolant from the compute nodes 114 to the cooling module 116. After the coolant in the coolant loop 112 absorbs thermal energy from the compute nodes 114, it is sent to the cooling module 116 where the coolant is preferably cooled down by releasing the thermal energy stored therein. The cooling module 116 may reduce the temperature of the coolant in the coolant loop 112 using any processes which would be apparent to one skilled in the art. For example, the cooling module 116 may be a cooling fan wall in some approaches. The cooling fan wall may include a number of electric fans that pass ambient air through the cooling module 116. As the air passes over portions of the cooling module 116 and/or the coolant loop 112 as it passes through the cooling module 116, the air is at a lower temperature than the coolant and is thereby able to indirectly absorb thermal energy from the coolant despite not coming into physical contact with the coolant itself, e.g., as would be appreciated by one skilled in the art after reading the present description.

It follows that the coolant leaving the cooling module 116 has a lower temperature than when it entered the cooling module 116. The amount of thermal energy the cooling module 116 is able to remove from the coolant in the coolant loop 112 varies depending on the configuration of the cooling module 116, the amount of thermal energy absorbed by the coolant, a flow rate of the coolant, etc. It follows that the cooling module 116 may be able to remove different amounts of thermal energy from the coolant depending on the situation.

For example, the cooling module 116 may detect that the coolant entering the cooling module 116 is at a higher temperature than normal, and adjust operating settings to remove a higher amount of thermal energy from the coolant than under a nominal operating setting. Similarly, the cooling module 116 may detect that the coolant entering the cooling module 116 is at a lower temperature than normal, and adjust operating settings to remove a lower amount of thermal energy from the coolant than under a nominal operating setting, e.g., to conserve energy usage.

Again, the coolant loop 112 is preferably a closed system such that coolant is unable to leak out and air is unable to enter. In other words, the coolant loop 112 is preferably sealed. This improves the thermal performance of the coolant loop 112 and allows the system 100 to operate efficiently. However, even a small leak in the coolant loop 112 negatively impacts performance by introducing thermal noise. This can compromise the whole system 100, leading to downtime, data loss, latency issues, etc.

Method 200 below includes a number of operations according to one implementation which may be performed to test whether a cooling loop has been constructed properly and does not include any unintended leaks, e.g., as will soon become apparent. The method 200 may be performed in accordance with the present invention in any of the environments depicted in FIG. 1, among others, in various embodiments. Of course, more or less operations than those specifically described in FIG. 2A may be included in method 200, as would be understood by one of skill in the art upon reading the present descriptions.

Each of the steps of the method 200 may be performed by any suitable component of the operating environment using known techniques and/or techniques that would become readily apparent to one skilled in the art upon reading the present disclosure. For example, in various embodiments, the method 200 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 200. Illustrative processors include, but are not limited to, a central processing unit (CPU), an application specific integrated circuit (ASIC), a field programmable gate array (FPGA), etc., combinations thereof, or any other suitable computing device known in the art.

Figure 2A:
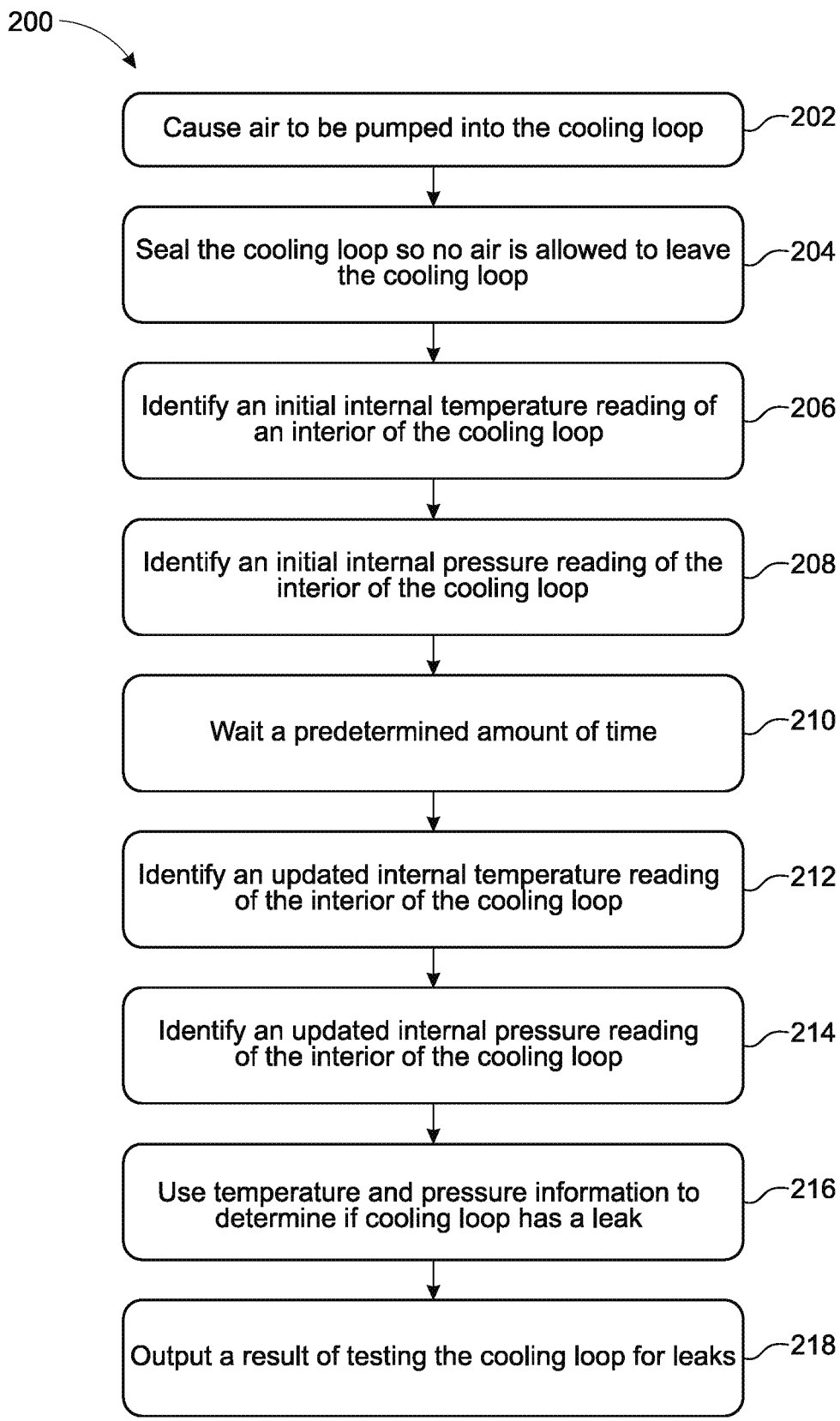
FIG. 2A is a flowchart of an example method for initializing a compute system, according to certain aspects of the present disclosure.

As shown in FIG. 2A, operation 202 of method 200 includes causing air to be pumped into the cooling loop. As noted above, an air pump may be used to selectively pump (e.g., force) air inside the cooling loop (e.g., see air pump 108 of FIG. 1). The cooling loop is preferably otherwise empty before pumping air therein. In other words, the air is preferably inserted in the cooling loop by an air pump while the cooling loop is otherwise empty and does not include any cooling liquid therein. Thus, method 200 may include a preliminary operation (not shown) that involves emptying the cooling loop of any liquids, solids, etc. before pumping in the air. It should also be noted that the term "air" as used herein is in no way intended to be limiting. Rather, any desired type of gas may be pumped into the cooling loop, e.g., such as helium, nitrogen, etc.

Operation 204 includes sealing the cooling loop so no air is allowed to leave the cooling loop. Depending on the implementation, this may involve closing a valve in an air compressor such that the cooling loop becomes sealed. In other implementations, the air compressor may use a one way valve to pump air into the cooling loop. Thus, the cooling loop may actually be sealed automatically once the air pump stops actively pumping air into the cooling loop.

The pressure and temperature of the air once in the cooling loop are also of interest in determining whether the cooling loop suffers from any unintended leaks. For instance, in contrast to physically inspecting every portion of the cooling loop to determine if any leaks are noticeable, the temperature and/or pressure of the air in the cooling loop may be monitored over time to determine if any unintended leaks are present. This may be accomplished by first forming an understanding of how the cooling loop acts. For example, while the cooling loop may actually be sealed (i.e., not have any leaks), thermal energy may still exit or enter the closed system. This is because heat transfer is able to penetrate through the walls of the cooling loop and affect the thermal properties of the air in the cooling loop. Thus, by determining a rate at which the cooling loop looses and/or gains heat in a repeatable testing environment, any divergence from that expected performance may be more easily identified.

Accordingly, operation 206 includes identifying an initial internal temperature reading of an interior of the cooling loop. In some approaches, the internal temperature reading may be determined by evaluating readings received from temperature sensors that are located inside the cooling loop. For instance, one or more temperature sensors may be coupled to an interior surface of the cooling loop and collect temperature readings. Depending on the implementation, the temperature readings may be averaged over a period of time, a highest temperature may be identified, a median temperature may be calculated, etc. It follows that the temperature readings may be collected, evaluated, stored, etc., differently depending on the implementations. Accordingly, these readings may be sent to a controller (e.g., see SCM 106 of FIG. 1) for processing.

Similarly, operation 208 includes identifying an initial internal pressure reading of the interior of the cooling loop. Again, the internal pressure reading may be determined by evaluating data received from pressure sensors that are located inside the cooling loop. For instance, one or more pressure sensors may be coupled to an interior surface of the cooling loop and collect pressure readings. Depending on the implementation, the pressure readings may be averaged over a period of time, a highest pressure may be identified, a median pressure may be calculated, etc. It follows that the pressure readings may be collected, evaluated, stored, etc., differently depending on the implementations. Accordingly, these readings may also be sent to a controller (e.g., see SCM 106 of FIG. 1) for processing.

Referring still to method 200, operation 210 further includes waiting a predetermined amount of time. In other words, operation 210 includes determining whether a predetermined amount of time has passed since the temperature and/or pressure readings were taken. In some implementations, the amount of time may be predetermined by a user, an administrator, a system architect, etc. In some implementations, the amount of time may be based on industry standards, past performance of the system, an intended use of the system, etc.

In response to determining that the predetermined amount of time has actually been met, method 200 proceeds to operation 212. There, operation 212 includes identifying an updated internal temperature reading of the interior of the cooling loop. In other words, operation 212 includes determining whether the temperature inside the cooling loop has changed since operation 206 was performed. This may be accomplished by comparing the updated internal temperature with the initial internal temperature. Moreover, the updated internal temperature readings may be received from the one or more temperature sensors positioned in the cooling loop.

While a difference in the values of the temperatures may indicate there is an unintended a thermal leak in the cooling loop, it should again be noted that virtually every closed system is susceptible to experiencing unintended thermal leakage into or out of the system. Thus, by identifying an amount of thermal energy that is expected to enter the cooling loop (e.g., using the laws of thermodynamics), method 200 may be able to further improve performance by identifying an amount of change in temperature that is expected to occur even in a properly sealed cooling loop, even if that amount is a very small amount. These thermal characteristics of the cooling loop and/or larger system may be determined using any desired processes which would be apparent to one skilled in the art after reading the present description.

Similarly, operation 214 includes identifying an updated internal pressure reading of the interior of the cooling loop. In other words, operation 214 includes determining whether the pressure inside the cooling loop has changed since operation 208 was performed. This may be accomplished by comparing the updated internal pressure value with the initial internal pressure value. Moreover, the updated internal temperature readings may be received from the one or more pressure sensors positioned in the cooling loop.

As the temperature of the air inside the cooling loop changes over time as thermal energy seeps into or is extracted from the cooling loop, the pressure will also change. Accordingly, it is expected that even in a properly sealed cooling loop, that a small amount of temperature and pressure variation will occur over time. Moreover, by learning details about the cooling loop, the amount that the temperature and pressure are expected to change may be determined (e.g., calculated). Accordingly, operation 216 includes using (i) the initial internal temperature, (ii) the initial internal pressure readings, (iii) the updated internal temperature, and (iv) the updated internal pressure readings, to determine if the cooling loop has a leak.

Figure 2B:
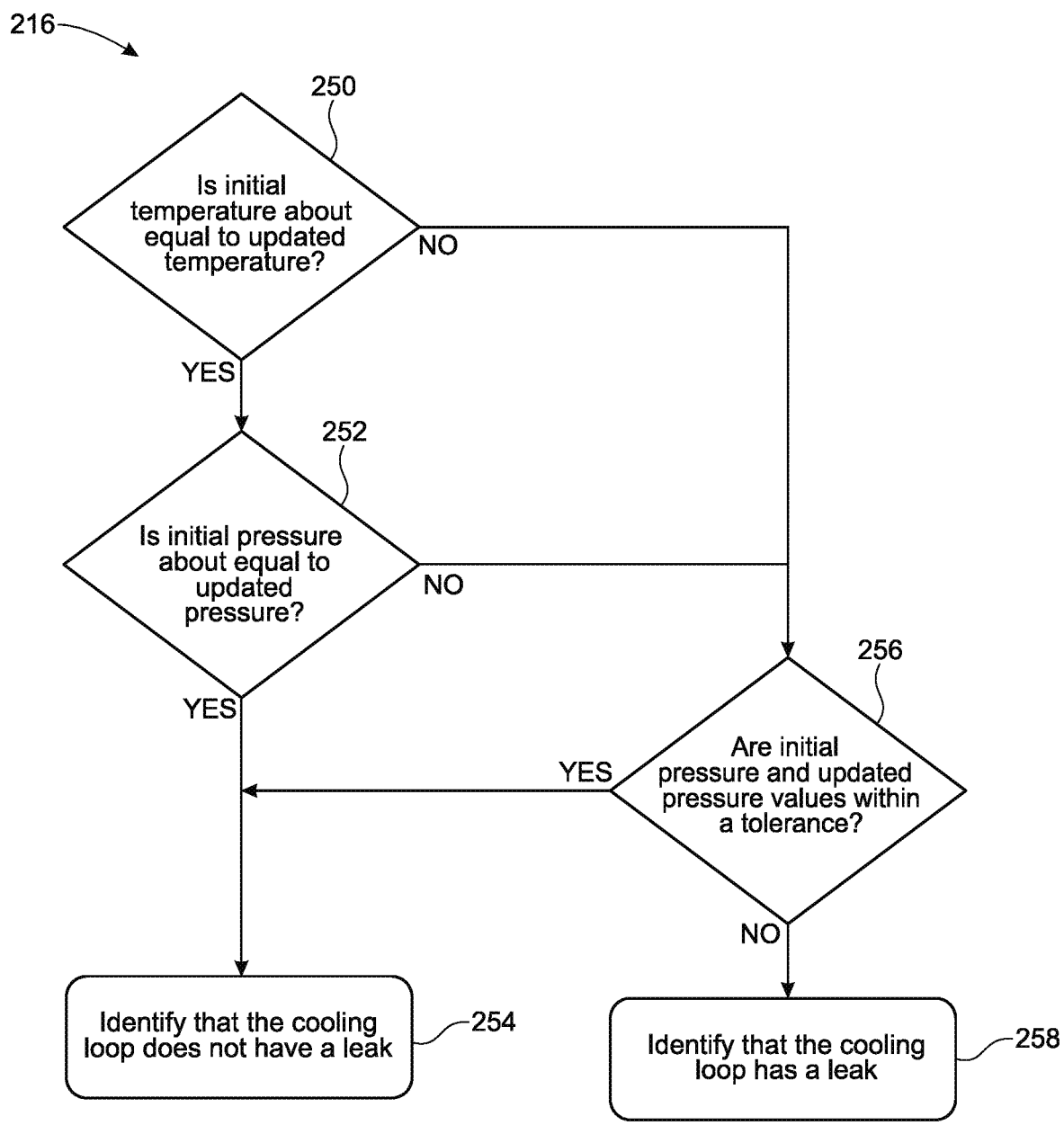
FIG. 2B is a flowchart of sub-operations for one of the operations in the method of FIG. 2A, according to certain aspects of the present disclosure.

Referring momentarily to FIG. 2B, exemplary sub-operations of determining whether a cooling loop has an unintended leak are illustrated in accordance with one embodiment. One or more of these operations may be used to perform operation 216 of FIG. 2A. However, it should be noted that the sub-processes of FIG. 2B are illustrated in accordance with one embodiment which is in no way intended to limit the invention.

As shown, FIG. 2B includes determining whether the initial internal temperature is about equal to the updated internal temperature. See operation 250. In response to determining that the initial internal temperature is about equal to the updated internal temperature, the flowchart proceeds from operation 250 to operation 252. There, operation 252 includes determining whether the initial internal pressure is about equal to the updated internal pressure. Again, this determination may be made by simply comparing the initial internal pressure with the updated internal pressure and determining whether an unexpected change was realized. While some approaches may identify any change in pressure as indicating a leak is present, other implementations may ignore natural temperature and/or pressure changes that occur over time as a result of physical systems being lossy, e.g., as would be appreciated by one skilled in the art after reading the present description.

In response to determining that the initial internal pressure is about equal to the updated internal pressure, the flowchart proceeds from operation 252 to operation 254. There, operation 254 includes identifying that the cooling loop does not have a leak. Depending on the implementation, operation 254 may include sending a notification to a user (e.g., see operation 218 of FIG. 2A), storing a result in memory, proceeding to additional operations, displaying a result on a display screen of a system, etc. In some implementations, the cooling loop may actually be approved as a result of reaching operation 254, whereby the cooling loop may be cleared for actual implementation, e.g., in a customer's system.

However, returning to operation 252, the flowchart proceeds to operation 256 in response to determining that the initial internal pressure is not about equal to the updated internal pressure. There, operation 256 includes determining whether the initial internal pressure and the updated internal pressure are within a predetermined tolerance. In other words, operation 256 includes determining whether a difference between the values of the initial internal pressure and the updated internal pressure is in a predetermined percentage range. As noted above, although a system (e.g., cooling loop) may be properly sealed, the system is still susceptible to minor thermal leakage resulting from thermodynamic principles in physical systems. Accordingly, the tolerance allows for natural changes in temperature and/or pressure to be taken into consideration.

For example, the tolerance may be about 5% in some implementations. In other implementations, the tolerance may be less than about 10%, less than about 15%, less than about 20%, between about 1% and about 7%, etc., and/or combinations thereof. Again, the tolerance may depend on the physical properties of the system and therefore may vary. While not shown in FIG. 2B, a tolerance may also be implemented with respect to changes in temperature, e.g., as would be appreciated by one skilled in the art after reading the present description.

From operation 256, the flowchart proceeds to operation 254 in response to determining that the initial internal pressure and the updated internal pressure are within a predetermined tolerance. There, operation 254 includes identifying that the cooling loop does not have a leak. However, in response to determining that the initial internal pressure and the updated internal pressure are not within the predetermined tolerance, the flowchart proceeds to operation 258. As noted above, operation 258 includes identifying that the cooling loop have a leak. It should be noted that "within a predetermined tolerance" is in no way intended to limit the invention. Rather than determining whether a value is within a predetermined tolerance, equivalent determinations may be made, e.g., as to whether a value is above a predetermined threshold value, whether a value is outside a predetermined range, whether an absolute value is above a threshold, whether a value is below a threshold, etc., depending on the desired approach.

Returning to operation 250, it should also be noted that the flowchart proceeds to operation 256 from operation 250 in response to determining that the initial internal temperature is not about equal to the updated internal temperature. Again, while changes in temperature may indicate a leak is present in some situations, determining how the pressure inside the cooling loop has changed over the same period of time provides valuable information. For instance, relationships between temperature and pressure may be used to identify whether a change in temperature corresponds to a change in pressure. Thus, a cooling loop identified as experiencing a change in internal temperature as well as a change in pressure that are within accepted tolerances, may still be identified as not having a leak therein.

As shown, the flowchart in FIG. 2B returns to operation 218 of method 200 in FIG. 2A from operations 254 and 258. There, operation 218 includes outputting a result of testing the cooling loop for leaks. The result preferably indicates whether the cooling loop was identified as having a leak therein, but may include any other desired information. For instance, the result may indicate an approximated severity of the leak in the cooling loop. According to an example, the result may include an approximate size of the leak as well as suggested next steps. In another example, the result may include a general location of the leak.

The results may be output differently depending on the approach. For instance, some approaches may issue a warning that indicates the cooling loop has a leak. The warning may be sent directly to a user, system administrator, etc., over a network; saved in memory (e.g., a lookup table); shown on a display at the system location, etc. According to other examples, the warning indicating the cooling loop has a leak may be sent from a secure control module, as an alert to a remote management console, etc. The cooling loop may also be flagged as needing additional inspection and/or repair, e.g., depending on the severity of the leak identified.

However, in response to determining that a cooling loop does not have a leak, the cooling loop may be flagged as being ready for use. Accordingly, one or more seals in the cooling loop may be released, thereby allowing air to exit the cooling loop. This allows the temperature and pressure in the cooling loop to be reset. After the cooling loop seals are released, actual coolant material (e.g., liquid) may be injected into the cooling loop. As noted above, the coolant may be injected into the cooling loop by a coolant pump (e.g., see coolant pump 110 of FIG. 1).

The type and amount of coolant pumped into the cooling loop depends on the implementation. For instance, some implementations use liquid water as a coolant in the cooling loop. Other implementations may use a liquid with improved thermal properties, e.g., such as premixed solutions. It should also be noted that while liquid coolant is described as being used in various implementations here, any desired type of thermal coolant may be used. For example, one or more gasses may be inserted in a coolant loop and used to achieve any of the transfers of thermal energy described herein, e.g., as would be appreciated by one skilled in the art after reading the present description. Moreover, the amount of coolant (e.g., total volume) and accordingly the size of the cooling loop may vary depending on the thermal profile of the compute nodes being cooled. For instance, a cooling loop having a larger volume of coolant is able to remove a greater amount of thermal energy, and may thereby be implemented in systems having larger compute throughput and/or workloads (e.g., strain) as would be appreciated by one skilled in the art after reading the present description.

As noted above, different processes may be used to determine whether the temperature and/or pressure in a given cooling loop being tested indicates that a leak is present. According to an in-use example, which is in no way intended to limit the invention, Equation 1 may be used to determine if a sealed system being tested has a leak.

$$P_1/T_1 = P_2/T_2 \quad \text{Equation 1}$$

In Equation 1, "$P_1$" represents an initial pressure, while "$T_1$" represents the an initial temperature, with the units preferably being in Kelvin (Celsius+273.15). It follows that the final pressure "$P_2$" at a temperature "$T_2$" can be calculated as $P_2=(P_1/T_1)*T_2$, where $P_1$ is the initial pressure at the initial temperature $T_1$. Based on this relationship, after air is pumped into a cooling loop (e.g., see coolant loop 112 of FIG. 1) which is sealed and kept in a constant environment, the initial temperature $T_1$ and pressure $P_1$ is are read, and then periodically the updated temperature T and pressure P can be received from various sensors.

Upon evaluating the information received from the various sensors, if $T_1=T_2$ and $P_1=P_2$, it can be determined that the cooling loop being tested does not have a leak. In other words, if both the temperature and pressure keep remain at respective constants, this indicates that the cooling loop is properly sealed and ready for use (e.g., to be filled with a liquid coolant). However, if $T_1=T_2$ but $P_1/P_2$, this indicates that the cooling loop does have a leak. In other words, if only the temperature inside the cooling loop remains constant, but the pressure changes and are not within accepted tolerances, this indicates that a leak is present. In situations where $T_1/T_2$ and $P_1+P_2$, the temperature and pressure inside the cooling loop change over time. While this can indicate a leak is present in the cooling loop, it can also correspond to changing conditions in a sealed cooling loop. Accordingly, certain relationships between the temperature and pressure may be stored in memory (e.g., a lookup table) as indicating the presence of a leak, while others indicate the absence of a leak. This information may then be used to evaluate information received from sensors in real-time. In some implementations, a machine learning model (e.g., deep learning model, artificial neural network, reinforcement learning model, etc.) may be trained on one or more different cooling loop implementations (e.g., designs) using labeled and/or unlabeled training data. The machine learning model may thereby be used to evaluate temperature and/or pressure readings received from the sensors positioned throughout the cooling loop to determine whether a leak is present. In some implementations, one or more such machine learning models may be implemented (e.g., used) to perform operation 216 of method 200 above.

Furthermore, Equation 2 below is another in-use example of determining whether a cooling loop has a leak.

$$P_2 - (P_2 * 5\%) < P < P_2 + (P_2 * 5\%) \quad \text{Equation 2}$$

As seen, Equation 2 implements a 5% tolerance, which again is in no way intended to limit the invention. Thus, by comparing the value of P with the value of $P_2$, the value of P should be within a 5% tolerance of $P_2$ in order to determine a leak is not present in the cooling loop.

It follows that implementations included herein improve performance of cooling loops and systems that implement them. As a result, compute systems are desirably able to operate at higher levels of performance while maintaining desirable operating characteristics (e.g., temperatures), e.g., as would be appreciated by one skilled in the art after reading the present description.

It should also be noted that the various implementations herein may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It follows that although various aspects of the implementations herein have been illustrated as including specific designs, orientations, numbers of components, etc., this is in no way intended to limit the invention. Rather, the implementations herein are presented for exemplary purposes only and may vary in design, orientation, number of components, etc., depending on the desired approach. It should also be noted that use of the terms "bottom", "lower", "top", "upper", etc., are in no way intended to be limiting. Any frames of reference used to describe the various implementations herein have been selected for illustrative purposes only and may be adjusted as desired.

It should also be noted that, while the disclosed implementations have been illustrated and described with respect to one or more approaches, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

It should also be understood that various implementations of the present disclosure have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A method for testing a closed cooling loop for leaks, the method comprising:
   causing air to be pumped into the cooling loop;
   measuring an initial internal temperature and an initial internal pressure of the cooling loop to identify an initial internal temperature value and an initial internal pressure value of the cooling loop;
   in response to a predetermined amount of time passing since the air was pumped into the cooling loop, measuring an updated internal temperature reading and an updated internal pressure of the cooling loop to identify an updated internal temperature value and an updated internal pressure value of the cooling loop;
   using (i) the initial internal temperature value, (ii) the initial internal pressure value, (iii) the updated internal temperature, and (iv) the updated internal pressure value to determine if the cooling loop has a leak; and
   in response to determining that the cooling loop has a leak, issuing a warning;
   wherein using (i) the initial internal temperature value, (ii) the initial internal pressure value, (iii) the updated internal temperature value, and (iv) the updated internal pressure value, to determine if the cooling loop has a leak includes:
      determining whether the initial internal temperature value is about equal to the updated internal temperature value;
      in response to determining that the initial internal temperature value is about equal to the updated internal temperature value, determining whether the initial internal pressure value is about equal to the updated internal pressure value; and
      in response to determining that the initial internal pressure value is not about equal to the updated internal pressure value, identifying that the cooling loop has a leak.

2. The computer-implemented method of claim 1, further comprising, in response to determining that the initial internal pressure value is about equal to the updated internal pressure value, identifying that the cooling loop does not have a leak.

3. The computer-implemented method of claim 1, comprising:
   in response to determining that the initial internal temperature value is not about equal to the updated internal temperature value, determining whether the initial internal pressure value and the updated internal pressure value are within a predetermined tolerance; and
   in response to determining that the initial internal pressure value and the updated internal pressure value are within the predetermined tolerance, identifying that the cooling loop does not have a leak.

4. The computer-implemented method of claim 1, wherein issuing the warning includes sending, from a secure control module, an alert to a remote management console, the alert including information associated with the cooling loop.

5. The computer-implemented method of claim 4, wherein the alert includes an estimation of a severity of the leak in the cooling loop.

6. The computer-implemented method of claim 3, further comprising, in response to determining the cooling loop does not have a leak:
   releasing a seal on the cooling loop; and
   causing the cooling loop to be filled with a liquid.

7. A computer program product for testing a closed cooling loop for leaks, the computer program product comprising a computer readable storage medium having program instructions embodied therewith, the program instructions being readable and/or executable to:
   cause, by a processor, air to be pumped into the closed cooling loop;
   identify, by the processor, an initial internal temperature value and an initial internal pressure value of the closed cooling loop;
   in response to a predetermined amount of time passing since the air was pumped into the closed cooling loop, identify, by the processor, an updated internal temperature value and an updated internal pressure value of the closed cooling loop;
   use, by the processor, (i) the initial internal temperature value, (ii) the initial internal pressure value (iii) the updated internal temperature value, and (iv) the updated internal pressure value, to determine if the closed cooling loop has a leak;
   in response to determining that the closed cooling loop has a leak, issue, by the processor, a warning;
   wherein using (i) the initial internal temperature value, (ii) the initial internal pressure value, (iii) the updated internal temperature value, and (iv) the updated internal pressure value, to determine if the closed cooling loop has a leak includes:
      determining whether the initial internal temperature value is about equal to the updated internal temperature value;
      in response to determining that the initial internal temperature value is about equal to the updated internal temperature value, determining whether the initial internal pressure value is about equal to the updated internal pressure value; and
      in response to determining that the initial internal pressure value is not about equal to the updated internal pressure value, identifying that the closed cooling loop has a leak.

8. The computer program product of claim 7, wherein the program instructions to further cause the processor to, in response to determining that the initial internal pressure value is about equal to the updated internal pressure value, identify that the closed cooling loop does not have a leak.

9. The computer program product of claim 7, wherein the program instructions to further cause the processor to:
   in response to determining that the initial internal temperature value is not about equal to the updated internal temperature value, determine whether the initial internal pressure value and the updated internal pressure value are within a predetermined tolerance; and in response to determining that the initial internal pressure value and the updated internal pressure value are within the predetermined tolerance, identify that the closed cooling loop does not have a leak.

10. The computer program product of claim 7, wherein issuing the warning includes sending, from a secure control module, an alert to a remote management console, the alert including information associated with the closed cooling loop.

11. The computer program product of claim 10, wherein the alert includes an estimation of a severity of the leak in the closed cooling loop.

12. The computer program product of claim 8, wherein the program instructions further cause the processor to, in response to determining the cooling loop does not have a leak:
 release a seal on the closed cooling loop; and
 fill the closed cooling loop with a liquid.

13. A compute system comprising:
 a coolant distribution unit;
 a central controller; and
 logic integrated with and/or executable by the central controller, the logic being configured to:
  cause, by the central controller, air to be pumped into a cooling loop;
  identify, by the central controller, an initial internal temperature value and an initial internal pressure value of the cooling loop;
  in response to a predetermined amount of time passing since the air was pumped into the cooling loop: identify, by the central controller, an updated internal temperature value and an updated internal pressure value of the cooling loop;
  use, by the central controller, (i) the initial internal temperature value, (ii) the initial internal pressure value, (iii) the updated internal temperature value, and (iv) the updated internal pressure value, to determine if the cooling loop has a leak;
  in response to determining that the cooling loop has a leak, issue, by the central controller, a warning;
  wherein using (i) the initial internal temperature value, (ii) the initial internal pressure value, (iii) the updated internal temperature value, and (iv) the updated internal pressure value, to determine if the cooling loop has a leak includes:
   determining whether the initial internal temperature value is about equal to the updated internal temperature value;
   in response to determining that the initial internal temperature value is about equal to the updated internal temperature value, determining whether the initial internal pressure value is about equal to the updated internal pressure value; and
   in response to determining that the initial internal pressure value is not about equal to the updated internal pressure value, identifying that the cooling loop has a leak.

14. The system of claim 13, wherein the logic is further configured to cause the central controller to:
 in response to determining that the initial internal pressure value is about equal to the updated internal pressure value, identifying that the cooling loop does not have a leak.

15. The system of claim 13, wherein the logic is further configured to cause the central controller to:
 in response to determining that the initial internal temperature value is not about equal to the updated internal temperature value, determining whether the initial internal pressure value and the updated internal pressure value are within a predetermined tolerance; and
 in response to determining that the initial internal pressure value and the updated internal pressure value are within the predetermined tolerance, identifying that the cooling loop does not have a leak.

16. The system of claim 13, wherein issuing the warning includes sending, from a secure control module, an alert to a remote management console, the alert including information associated with the cooling loop.

17. The system of claim 16, wherein the alert includes an estimation of a severity of the leak in the cooling loop.

* * * * *